(12) United States Patent
Brown (10) Patent No.: US 8,972,954 B2
(45) Date of Patent: Mar. 3, 2015

(54) DEBUGGING METHOD USING PROGRAM INSPECTORS TO DEBUG PROGRAMS DEVELOPED USING FRAMEWORKS AND LIBRARIES

(75) Inventor: Donald P. Brown, Bothell, WA (US)

(73) Assignee: Adobe Systems Incorporated, San Jose, CA (US)

( * ) Notice: Subject to any disclaimer, the term of this patent is extended or adjusted under 35 U.S.C. 154(b) by 1354 days.

(21) Appl. No.: 12/502,110

(22) Filed: Jul. 13, 2009

(65) Prior Publication Data

US 2014/0033183 A1   Jan. 30, 2014

(51) Int. Cl.
  *G06F 9/44*   (2006.01)
(52) U.S. Cl.
  USPC ......................................................... 717/131
(58) Field of Classification Search
  CPC .................................................. G06F 11/3466
  USPC ......................................................... 717/131
  See application file for complete search history.

(56) References Cited

U.S. PATENT DOCUMENTS

| | | | | |
|---|---|---|---|---|
| 7,596,778 | B2* | 9/2009 | Kolawa et al. ............. | 714/38.13 |
| 8,261,240 | B2* | 9/2012 | Hoban et al. ................. | 717/125 |
| 2006/0242196 | A1* | 10/2006 | Tsyganskiy et al. ...... | 707/103 Y |
| 2007/0220492 | A1* | 9/2007 | Brugiolo et al. .............. | 717/126 |
| 2008/0244547 | A1* | 10/2008 | Wintergerst et al. .......... | 717/158 |
| 2009/0013208 | A1* | 1/2009 | DiMuzio .......................... | 714/2 |
| 2009/0158099 | A1* | 6/2009 | Cui ................................. | 714/57 |

* cited by examiner

*Primary Examiner* — John Chavis
(74) *Attorney, Agent, or Firm* — Shook, Hardy & Bacon L.L.P.

(57) ABSTRACT

A debugging method for use with computer programs that may include a number of program components such as objects within a software framework. The debugging method includes providing a debugging environment with a debugger that generates debugging information, including runtime state information, for each of the program components. The method includes identifying one of the program components for inspection within the debugging environment. The method includes using an inspector selection module to select a set of program inspectors to perform the inspection of the identified program component, e.g., by first determining the type of object or program component that has been identified or based upon a type of issue being debugged. The method includes performing the inspection with these program inspectors or scripts that each define a particular potential user error or nonstandard usage of an object, and outputting a report of the programming issues identified by the program inspectors.

19 Claims, 6 Drawing Sheets

DEBUGGING METHOD USING PROGRAM INSPECTORS TO DEBUG PROGRAMS DEVELOPED USING FRAMEWORKS AND LIBRARIES

BACKGROUND

1. Field of the Description

The present disclosure relates, in general, to computers and programming and developing code and programs to be run by computers, and, more particularly, to improved methods for assisting programmers in debugging code when the programmers are using software frameworks, libraries, and/or collections, subroutines, bundles, groups, or the like of previously developed/programmed code to create a software product, program, or application.

2. Relevant Background

There is a growing trend toward developing or creating software programs or code by utilizing and building upon code previously written or created by others. For example, numerous software providers offer code that may be used to build a software program in the form of software libraries and frameworks that the programmers or developers may include in their new program or software product. To use software libraries, the programmer typically is forced to understand the functionality of each method while frameworks tend to be designed to facilitate software development by allowing programmers or developers to devote their time to meeting desired product functionality rather than dealing with the more standard, low-level details of providing a working software product. For example, the programmer is allowed to focus on higher level operations, such as account withdrawals in a financial application, instead of the mechanics of request handling, state management, and the like.

In any of these cases, a software developer may be including others' code in their software product or application without fully understanding how each included code set or bundle of code works and operates. The code bases provided by libraries, frameworks, and the like are frequently very complex, and the developer is rarely an expert in programming in the particular language or in understanding how the framework controls process and data flow. Such abstraction of the lower-level details is useful until the time comes when the framework or library or a program built using the code provided in such a code base is not behaving as the developer expected or planned.

At this point, the framework or developed program may not be able to run at all or runs in unexpected or undesired ways, and the program or framework may have one or more bugs that the developer has to identify and correct. The bug often is caused by some mismatch between the developer's usage of a framework's objects, a library's methods, a sources bundle of code, or the like in their software product, program, or application and the intended or standard usage of such previously developed code. However, since the developer did not write or create the code used from the framework, library, or other code base/source, debugging the framework or other software product is time consuming and, in some cases, impractical for the developer without outside or additional assistance from those intimately knowledgeable about the underlying code.

SUMMARY

Briefly, a debugging environment and method is described that provides tools (e.g., dynamic program inspectors) that may be invoked from within a debugger to inspect the runtime state of an object or a set/bundle of code within a program. The developer or user of the tools or an inspector control module may act to identify one or more objects or sets of code within a program (such as within a framework) that may be a cause of the problem or that may have one or more bugs. The inspector control module may determine the type of object or set of code for each object or code set that has been identified and then invoke (such as from within the debugger) a subset of the tools or program inspectors based on this object or code set type suited for debugging or inspecting the particular suspected or identified objects or code sets.

A prioritization module may be used by the inspector control module to receive and prioritize the feedback from the invoked tools or inspectors, and this prioritized feedback may then be provided to the developer or tool user (e.g., via a graphical user interface (GUI) or the like). The feedback helps identify problems or objects that may be acting improperly or in an unanticipated or nonstandard manner, and each issued identified by the program inspectors may be linked to a summary of the potential problem and one or more possible remedies that may be taken by the developer to address the problem or bug (e.g., a brief summary may be displayed with a link to a more detailed explanation of the problem and/or solution that may be accessible via a digital communication network or provided within the same computer system). It is likely that the debugging environment described herein may be valuable in a number of programming environments including framework environments where bugs may be frequently caused by misuses of the framework or simple mistakes for which traditional debugger features offer little or no assistance.

More particularly, a debugging method is provided for use with computer programs that may include a number of objects. For example, the debugging method may be used to debug a software application that is being generated or developed using a framework from which a developer has chosen or included a number of objects, which correspond to sets or numerous lines of code that has been previously developed and debugged lines of code that work together when used in a conventional/standard manner to provide an intended functionality. The debugging method includes providing a debugging environment (such as an integrated development or debugging environment (IDE)) on a computer system (such as a developer's computer, workstation, network node, or the like). The debugging environment includes a debugger that is run to generate debugging information that may include runtime state information for each of the program components or objects. The library/framework code itself has usually been well debugged by its authors prior to being made available for outside developers. As such, any issues encountered by users of the framework are likely not to appear in a conventional debugger (e.g., as a crash or easily identified localized bug and the code may be free of programming errors that are detected by the debugger).

The method further may include identifying one of the program components for inspection within the debugging environment, and this may be done by displaying a prompt within the debugger user interface that the developer/user may select to indicate that they think an object is acting improperly (e.g., is behaving in an unintended or nonstandard manner potentially from use of the object in an unintended manner or an object user error) for analysis by a set of program inspectors. The method may also include using an inspector selection module (which may be invoked by the debugger or another software module within the debugging environment) to select a set of program inspectors to perform the inspection of the identified object. The set of program inspectors may be selected by first determining the type of object or program component that has been identified or based upon a type of issue being debugged.

The method may further include performing the inspection with these program inspectors and outputting (e.g., displaying in a debugging UI, printing to a printer, or the like) a report of the programming issues (e.g., nonstandard usages and so on) identified by the invoked set of program inspectors. Each of the program inspectors may be provided with a script that defines a particular object use error for an object (e.g., incorrect definition of a child, an object use that provides graphic that is not attached to a stage or drawn off stage, a use of a graphic object that produces a transparent graphic, a use that results in missing but expected overrides, or the like), and the script may be run or invoked within the debugging environment to query the object or program component (e.g., to query the debugging information that may include runtime state information on the component or object) to determine whether the object use error is present.

The report or output provided by the program inspectors may include a brief explanation of the identified programming issues for the object along with a remedial or corrective course of action for each of these issues and, in some cases, a link to a detailed report on the issues and ways to debug these issues (e.g., a URI or the like to a debugging server storing the more detailed explanations and remedies for potential issues). The inspection may include prioritizing the programming errors and presenting the errors in a prioritized manner in the inspector output/report, and in some cases, the priority is based on identifiers/rankings of the inspectors that are indicative of the seriousness or importance of the potential issue identified by the particular inspector/script. In some cases, the programming errors or object use errors may be nonstandard uses of an object or programming component or use that was not intended/expected by the author of the set of code (such as an author of a set of code defining an object within a programming/software framework).

According to another aspect of the description, a computer program product is provided that includes a computer useable medium and computer readable code embodied on the computer useable medium for causing a debugging of a software product having a number of objects in a framework. The computer readable code may include computer readable program code devices that cause a computer to select, from a plurality of program inspection scripts, a set of inspectors that are applicable to an identified one of the objects. Also, the computer readable code may include computer readable program code devices that cause the computer to invoke the set of inspectors to analyze runtime state information for the identified object. The invoked inspectors or scripts may act to determine whether a definition of a programming error (such as user's misuse or nonstandard use of an object) in the program inspection script of the inspector is satisfied.

Further, the computer readable code may include computer readable program code devices that cause the computer to generate a report comprising output from the set of inspectors including a description of each of the identified programming errors and an associated programming remedy. In some cases, the computer readable code may also include computer readable program code devices that cause the computer to determine a type associated with the identified object, with the set of inspectors being identified as applicable when they are defined as applicable to the determined type (such as by an included list of relevant objects or object types). In some cases, the computer readable code may also include computer readable program code devices that cause the computer to run a debugger on the software product to generate the runtime state information for the identified object. Further, the code may include computer readable program code devices that cause the computer to generate a user interface and to display the user interface on a monitor, whereby the user interface includes the generated report. In some cases, the code also includes computer readable program code devices that cause the computer to receive user input via the user interface selecting the identified object prior to the selecting of the set of inspectors.

With the use of the program inspectors/scripts, the runtime state is being inspected and not merely the lines of code or a portion of the program. For example, the inspectors may dynamically query an object, at runtime, about the current state of its members such as expected transitions during execution that are defined by the underlying code set. This is similar in some ways to a debugger showing the user the state of a program's variables, but a difference is that in addition to showing the user the current state of the object's members, there is associated logic (e.g., the inspector script) to inspect the object's state, alter its behavior based on the state it encounters, and then make inferences about the object's state in relation to its notions of the "normal states" of that object in its current execution context.

In brief, the program inspectors are not tied to specific lines of code, which could be readily debugged using static analysis of the code in a compiler. Instead, the code describes the creation of objects and then the transitions which should occur to the objects as the program is executing. This allows the debugger to run another program, while the original program is paused in the debugger, using the underlying programs current, e.g., paused, state as input. The additional program (or program inspector) is then, due to the reflexive nature of many languages, able to derive enough information from an object about its type and the current state (or runtime state) of the underlying program to decide what appears to be nonstandard or unanticipated. The program inspector may be thought of as a metaprogram that uses the state of the existing, paused program as input.

DETAILED DESCRIPTION

The following description describes a debugging environment in which a software developer or programmer may apply a set of program inspectors to one or more portions of a program to determine whether any potentially problematic or nonstandard functionality issues exist and to provide recommended corrective actions or remedies for these issues or bugs. In contrast to more conventional debuggers, the debugging environment would act upon a set of code (or lines of code) such as those found in an object of a framework, a method from a library, or the like, which often will have been written by a third party and used to create a larger program or application by the developer or programmer.

The debugging environment may include a debugger that for one or more suspect or candidate objects or sets of code functions to identify a set of applicable program inspectors, such as based upon a determined type of object or code set. Each of the inspectors may be scriptable software tools, run on or accessible by the developer's computer or processing node, that is used to analyze numerous lines of code to identify potential non-standard uses or other problems that may cause improper running of the object or set of code. The candidate objects or sets of code may be identified by the developer or user of the debugging environment or in a fully or semi-automatic manner by the debugger itself, e.g., debugging processes performed by the debugger or debugger module may identify objects with one or more bugs and provide these to the developer or simply run the inspectors on these objects. The set of program inspectors may be invoked within the debugging environment (such as by the debugger module) to analyze the object or set of code and provide a set of potential problems and remedies. The debugging environment may then act to simply report the inspector output to the developer such as via a debugging graphical user interface (GUI) or act to first prioritize the inspector outputs and then display the prioritized bugs and remedies.

It was recognized that there is a growing trend toward developing or creating software programs or code by utilizing and building upon code previously written or created by others. For example, numerous software providers offer code that may be used to build a software program in the form of software libraries and frameworks that the programmers or developers may include in their new program or software product. Libraries are collections of utility classes and methods that the code or program being developed may call upon to perform some functionality. Frameworks are similar to software libraries in that they include reuseable abstractions of code that may be wrapped in a well-defined application programming interface (API), but, unlike libraries, the overall program's flow of control is not dictated by the caller but, instead, by the framework.

As discussed above, to use software libraries, the programmer typically is forced to understand the functionality of each method while frameworks tend to be designed to facilitate software development by allowing programmers or developers to devote their time to meeting desired product functionality rather than dealing with the more standard, low-level details of providing a working software product. For example, the programmer is allowed to focus on higher level operations, such as account withdrawals in a financial application, instead of the mechanics of request handling, state management, and the like. In any of these cases, a software developer may be including others' code in their software product or application without fully understanding how each included code set or bundle of code works and operates. The code bases provided by libraries, frameworks, and the like are frequently very complex, and the developer is rarely an expert in programming in the particular language or in understanding how the framework controls process and data flow. Such abstraction of the lower-level details is useful until the time comes when the framework or library or a program built using the code provided in such a code base is not behaving as the developer expected or planned. At this point, the framework or developed program may not be able to run at all or runs in unexpected or undesired ways, and the program or framework has one or more bugs that the developer has to identify and correct. The bug often is caused by some mismatch between the developer's usage of a framework's objects, a library's methods, a sources bundle of code, or the like in their software product, program, or application and the intended or standard usage of such previously developed code. However, since the developer did not write or create the code used from the framework, library, or other code base/source, debugging the framework or other software product is time consuming and, in some cases, impractical for the developer without outside or additional assistance from those intimately knowledgeable about the underlying code.

Generally, debugging is a methodical process of finding and reducing the number of bugs or defects in a computer program to cause it to behave as expected or intended by the developer. Debugging is often a lengthy and tiresome task, which may rely heavily upon the skill of the programmer to debug a problem. To assist in this task, tools including debuggers have been created to assist the programmer in identifying problems in their code. Debuggers are software tools that enable the programmer to monitor execution of a program and, in some cases, to start and restart the program, change values in memory, and take other steps to try to find the error in the program that is causing the unexpected behavior(s) or the program to crash or fail to execute.

Unfortunately, a traditional debugger only allows the developer or user to analyze the detailed state of a program's execution and the small transitions in state that happen as the code executes. This is helpful when a programmer is writing code to perform a particular task and when a developer has written all or at least much of the code that is executing at the level the debugger is providing information. It is much less useful when a set or bundle of code that was previously created by a third party is being used to create a larger program or product, such as when a developer is using a framework that may include numerous objects or bundles of code from the framework to provide a desired application or software product. When large libraries or frameworks are involved the debugger will correctly determine the state of the machine and let the user manipulate variables, but the code that is being debugged is often not code the user wrote. It may be many function calls underneath anything that the developer has written, and, as such, the debugger provides very detailed information about the execution state of something the developer has little to no understanding of such that the information, while extremely accurate, is of little value to that developer. In such cases, the issue may involve non-standard usage of someone else's code with the underlying code or framework object working properly when used as intended but operating unexpectedly or in a nonstandard or unanticipated manner when used in a non-standard or unintended manner. To debug the program, the developer or programmer is forced to use a debugger and walk through and understand each line of code to find problems. As will be appreciated, this is a daunting and difficult task because each object or set of code used from a library, framework, or other third party-code source was written by another and may include hundreds or thousands of lines of code. This is in direct conflict with the desired intent of a framework to free up the developer from having to understand the lower level programming details and potential rules and oddities of each programming language.

More recently, numerous communities or discussion groups have appeared on the World Wide Web or that are accessible via the Internet to assist a developer in debugging their program. For example, a programmer may use a framework to create a program made up of numerous framework objects or to create a program using code from one or more libraries, and the user may query an online user community to try to find a fix or solution to a bug or problem in their program. This process often can allow the developer to access individuals with significant experience with the underlying code of their program and find solutions to their bugs, but, unfortunately, the developer may still spend significant amounts of time with or without successful resolution.

One problem is that the conversation is not instantaneous as the members of the community may only respond periodically. Another problem is that the developer may have to phrase their questions accurately or in a particular way to obtain a useful answer such as by using the correct keywords for a search. A further problem is that the conversation is iterative with one question and answer often leading to another and so on until a useful answer is or is not reached via the online user community. An example conversation may involve the developer/debugger asking for help by stating what they think is their issue or problem (such as a graphic will not render properly or is displayed in an incorrect position in a user interface). A member of the community may then ask follow up questions such as which version of a framework the developer/debugger is using, and this leads to an answer. The community member or debugging expert may instruct the developer to provide further information such as details from the debugger output, which may lead to further questions and answers until an answer is found or the community member(s) is unable to help. Hence, debugging via a user community or help group may be useful in some situations but, without more, may take a significant amount of time and often requires the developer/debugger to have at least some level of knowledge of the underlying code and the debugger so as to properly frame questions and answers during the debugging conversation.

Figure 1:
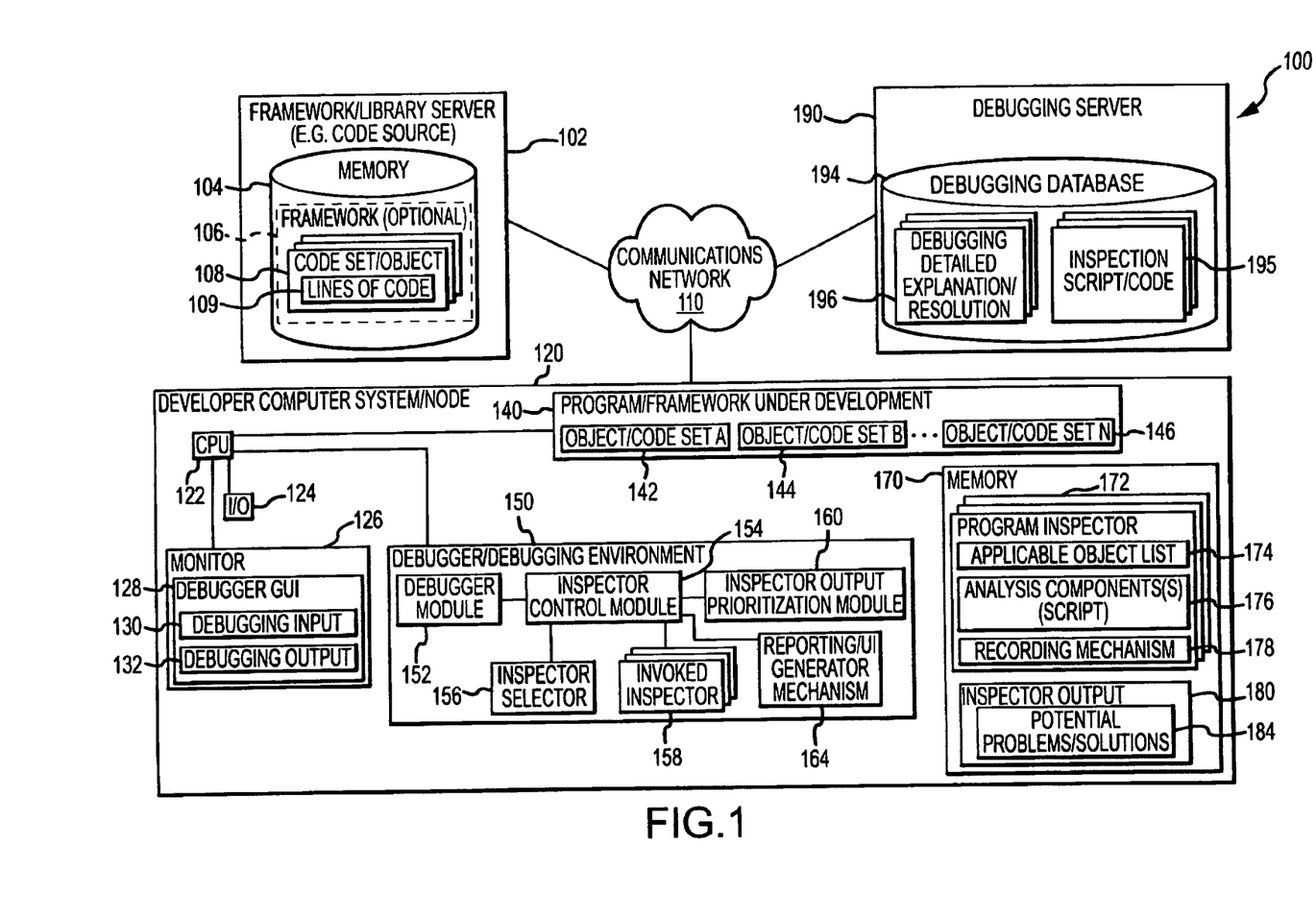
FIG. 1 illustrates in functional block form a computer system or network that is configured to support debugging processed described herein such as by providing a debugging environment including one or more invoked program inspectors for analyzing sets of code (e.g., multiple lines of code), objects, or the like to identify potential problems or bugs and recommended resolutions or debugging actions.

With the above in mind, FIG. 1 illustrates a debugging network or computer system 100 that is configured with software and hardware components to perform the program inspector-based debugging methods described herein. The software components of system 100 such as those found in the debugger/debugging environment 150 may run on any of a number of differing computer or processing devices that may be adapted with one or more processors managing operation of input/output devices and memory and running software modules or programs and that may be provided via computer-readable medium adapted to cause a computer or similar device 120 to perform the functions described herein. In this discussion, computer and network devices and data store devices are described in relation to their function rather than as being limited to particular electronic devices and computer architectures. To practice the invention, the computer devices and network devices may be any devices useful for providing the described functions, including well-known data processing and communication devices and systems such as desktop or similar higher processing capacity computers, and personal digital assistants, personal, laptop, notebook, and other more portable computers with processing, memory, and input/output components, and server devices configured to maintain and then transmit digital data over a communications network. Data, including device qualification data, device simulation data, event messages/files simulating device operations in response to device qualification data, and transmissions to, from, and within systems is typically communicated in digital format following standard communication and transfer protocols, such as TCP/IP, HTTP, HTTPS and the like, but this is not intended as a limitation of the invention. The description is not limited to a particular debugger implementation or particular programming language or environment although the debugging techniques using program inspectors is well-suited to use with software frameworks that provide objects or sets of code (e.g., numerous lines of code that provide a subfunction typically provided by a third party programmer as a programming building block) that a software developer may utilized to achieve a program or application with a desired functionality.

As shown in FIG. 1, the system 100 includes a framework/library server 102 that is linked to a digital data communications network 110 (such as the Internet, an intranet, a WAN, a LAN, or the like). The server 102 acts as a code source with memory or data storage devices 104 that store (and can be used to serve over the network 110) one or more code sets or objects 108 that each include a plurality or number of lines of code 109. The objects 108 may be associated with a framework 106 (e.g., Adobe Flex from Adobe Systems Incorporated, Silverlight, MFC, ATL frameworks available from Microsoft, Inc., or similar frameworks) that controls flow of the objects 108, but this is not required to implement the system 100.

The system 100 further includes at least one developer computer system or network node 120 that is communicatively linked to the framework/library server 102 via the communications network 110. Note, in some embodiments, the framework 106 and/or objects 108 are provided on the system 120 (i.e., on the same machine/machines used to provide the developer computer system 120). The developer computer system 120 includes a processor 122 that manages operation of input/output (I/O) devices 124 that may include keyboards, a mouse, a voice recognition system, a touchscreen, and the like that allow a user to provide input such as debugging input 130 and the I/O devices 124 may include one or more printers to allow the system 120 to output hard copies of the debugger output 132 or reports from the debugging environment 150. The processor 122 also runs or manages operations of a monitor 126 with a screen/display that is used to display at least a debugger GUI 128 that may be used to display a program or its portions that are being debugged by a user of the system 120, to display and/or prompt the user for debugging input 130 (e.g., to choose a program to debug, to select or identify an object or set of code within the program that the user/developer believes may be running improperly (acting in a nonstandard manner) or may have a bug, to request that program inspectors be identified and applied to the selected or identified object or set of code, and so on), and/or to display debugging output 132 such as reports of program inspector outputs that identify potential issues in an object or set of code and provide remedies that may address the issues.

The developer computer system 120 may be operated by a user to develop a program or framework as shown at 140, and the program 140 may be created by accessing the server 102 (or internal data stores) to retrieve one or more objects, methods, or other sets of codes as shown at 142, 144, 146. The objects 142, 144, 146 act in conjunction to provide a set of intended functions for the program or framework 140 (e.g., various functions of a user interface presented via a website, functions of a financial software application, functions of an application for a wireless device, and the like).

To enable a user of the system 120 to debug the program/framework 140, the computer system 120 may run a debugger/debugging environment 150. In one embodiment, the environment 150 is a software application or set of software tools or components that are run by the processor 122 to provide an integrated development or debugging environment (IDE) (e.g., a source code editor, a compiler and/or interpreter, build automation tools, a debugger, and the like). As shown, the debugging environment 150 includes a debugger or debugger module 152 (e.g., a conventional debugger typically provided in an IDE or other debugging application).

During debugging of the program/framework 140, the debugger module 152 may include or invoke an inspector control module 154. The inspector control module 154 may act to coordinate the inspector-based debugging functions described herein and shown in FIG. 2. For example, the inspector control module 154 may function to identify one or more objects/code sets 142, 144, 146 that may have issues in their runtime state or such identification may involve processing debugging input 130 from a user (e.g., a user may select to run the inspector-based debugging on a particular object in program 140). The inspector control module 154 may then act to determine the type or other identifying parameters for the object, and then to call or invoke an inspector selector 156.

The selector 156 may act to access memory 170 (or another source via the network 110 of program inspectors), which is included in the system 120. The memory 170 stores a number of program inspectors 172 that are each designed to be run on a particular type of object or set of code 108 and to determine whether the object or set of code has been properly (e.g., according to conventional or standard usage) implemented, used, defined, or the like within the program or framework and to report any identified issues or possible bugs (e.g., non-standard usages or the like) and potential remedies. Each program inspector 172 is shown to include an applicable object list 174 that the inspector selector 156 can compare to the object type determined by the control module 154. Each program inspector 172 may also include an analysis component (e.g., an analysis script) that it performs to query or inspect the runtime state of the object or program component to identify one or more particular issues. An inspector 172 also typically will have a reporting mechanism 178 for outputting the identified issues (or lack thereof in some cases) and potential remedies paired with the identified issues.

Once the inspector selector 156 identifies a set of program inspectors from memory 170 (or other source of such inspectors), the inspector control module 154 may invoke the set of inspectors 158 within the debugging environment 150. Each inspector 158 may inspect the runtime state of the object or program component such as object 142, 144, and/or 146 and provide feedback or output 180 (that may be stored at least temporarily in memory 170). The output of the inspectors 180 typically will include a listing of potential problems found for the object/program component along with a set of solutions as shown at 184. In some cases, the inspector control module 154 may further use an inspector output prioritization module 160 to prioritize or determine the likely importance of each of the potential problems/solutions 184, which may be based on a priority ranking of the inspector itself in some cases, based on a priority parameter linked to the problem or remedy, or some other priority parameter(s). The control module 154 next may use a reporting or UI generator mechanism 164 to provide the debugging output 132 via the monitor 126 including (or at least based on) the inspector output 180.

In some cases, the inspector output 180 may be a relatively brief statement of the potential problems and possible remedies with a link (e.g., a Uniform Resource Locator (URL)) to a source of more detailed explanations that may also be displayed via debugger GUI 128 on monitor 126. For example, the link in the debugger output 132 may provide a link to a debugging server 190 that includes a debugging database 194 with a plurality of inspection scripts/codes 195 and detailed explanations 196 of identified issues in objects or program components and/or detailed explanations of resolutions, remedies, and/or corrective actions. Note, the information provided in servers 102, 190 is shown to be distributed over network 110, but these sets of data such as scripts 195 may be resident on the developer's machine 120 at the time debugging is being performed (e.g., the configuration of system 100 shown in FIG. 1 is not limiting to the particular arrangement of the components/functions used to implement the system 100 or methods of debugging described herein).

The system 100 is adapted to encapsulate the wisdom and experience that may be obtained (e.g., through a question and answer period) from a person experienced in debugging a particular object or program component type or even from a community of such people. This level of debugging assistance is provided or packaged in each program inspector 172, and a user of the developer computer system 120 does not need to be able to frame questions in search engine language or even frame a question concerning a particular problem with the program 140. In some cases, the user may have an idea about which object 142, 144, and/or 146 is not behaving as they expect or intend, and then locate it in the debugger environment 150 (or otherwise provide it to the debugger module 152 for use in invoking one or more inspectors 158). The user may then invoke the inspector control module 154 to look for problems using a set of inspectors 158, and often these problems and solutions 184 may include problems/solutions the user may not have ever considered or at least been able to identify without hours of work.

Generally, the system 100 and the inspector-based debugging environment 150 allow a company, developer group, or the like to create a set of probable or potential errors that programmers/developers make (or things people often get wrong or the like), such as when using a particular framework, a library and its method/components, and so on. The environment 150 also allows the user or developer to see at run time and, typically, inside an IDE or other debugging environment 150, which suggestions or solutions 184 apply (e.g., in debugger output 132 in GUI 128). The use of debugging environment 150 dramatically reduces the barrier to entry for adoption of a framework or other source of third party program components as developers are more easily able to overcome the early stumbling blocks in much less time and with less frustration than would be the case without the environment 150 and its inspector-based debugging.

With a general understanding of the system 100 understood, it may be useful to describe a more concrete or specific example of inspector-based debugging as may be provided by operation of system 100. A program developer may have an object such as a UI component or the like that is not behaving as expected such as not rendering, rendering/displaying in the wrong place, no events received, or the like, and the developer cannot figure out what is causing the unintended behavior. Rather than resorting to walking line-by-line through potentially thousands of lines of code within an object or program component (which the developer probably did not write but instead obtained within a framework or library) or resorting to a user community, the user may simply identify the component or object (such as via a right mouse click, a touch and drag on a touch screen, or the like) in a debugger window or other GUI. A tool(s) including a set of inspectors applicable to the object type is used to process the object or program component.

In some cases, the inspector control module may present a list of "issue categories" (such as not rendering, wrong place, no events received, or the like) in the debugger GUI to prompt the developer to find a category of issue or problem that describes their problem, and the inspectors selected are chosen based on the user's selection of one or more of these categories (instead of or in addition to the selection of program inspectors based on object or program component type). Then, a set of analysis scripts/tools (e.g., program inspectors) is run live, in real time, to see what looks problematic or non-standard about the identified/selected object's runtime state. The debugging environment then may prioritize any detected oddities or potential issues/bugs and report these back to the developer along with descriptions of remedies and/or links to write ups on possible causes and solutions.

An example of this may be provided in a framework context (such as in the context of Adobe Flex or the like), and the inspector may include a script that notices that the developer added an improper or non-standard child. In an Adobe Flex implementation, a developer may have an object in their program that added an mx:UIComponent as a child of a normal mx:DisplayObject (or non-UIContainer). While this is legal/allowable and the object and overall program runs, the UIComponent may not be drawn. The object or program component is functional in some ways (e.g., it may receive events) which makes its invisibility even more confusing. Most of the object's properties appear satisfactory to a debugger. The problem is that the UIComponent's methods such as createChildren( ), commitProperties( ), measure( ), and the like are not correctly invoked on the object because its parent does not know to do that function. As such, the object is not fully functional as intended and does not render as expected. This bug or issue may require significant effort to identify and correct without the use of program inspectors that are able to readily identify this bug or potential issue and present a remedy or suggested solution. Particularly, a program inspector to be run on this type of object or program component to detect this bug may include, for example but not limitation, a script such an ActionScript code fragment like: "if (obj is UIComponent and !(obj.parent is UIContainer)) Report("UIComponent not contained in a UIContainer hierarchy")." More examples of potential issues, bugs, or common user errors are things such as "the object is not on a stage," "the object is clipped," "you are listening for events which that object will not dispatch," "you forgot to call super.foo( ) in your override of foo( )," and the like. There are likely numerous other common user errors that can be identified and used to provide program inspectors (that may include scripted questions used to determine if the corresponding user error is present in a runtime state of a program component or object).

During use of program inspectors, the execution environment where the user's code runs is adapted to be able to programmatically inspect the state of the program and the objects within it while the program execution is halted. This is how typical debuggers work, and, hence, debuggers provide a good environment for a technology like the inspector-based debugging to be deployed. Some programming languages are "reflective" (e.g., Java, ActionScript, C#, python, and the like), which makes inspection of a halted program much easier because the layout in memory and names of the members of objects and so on are intrinsically queryable at run time. This is not true of many fully compiled languages (such as C++), unless there is additional metadata available to help an external tool navigate the data structures. Again, though, in the context of a debugger, the debugging information which the compiler generates may adequately serve this purpose. The debugging environment described herein may be provided in part with a scripting language (e.g., a language similar to that being debugged), which is able to navigate around an object and ask questions about it to identify potential issues or bugs. The tools used to provide an inspector-based debugging environment may include or provide facilities for these scripts to report likely relevance along with a brief descriptive text and a link to more verbose information.

As noted above, the debugger/debugging environment 150 is provided by the CPU 122 running or executing instructions or code that may be stored in data storage such as memory 170 (e.g., computer readable medium with code devices and the like) prior to execution. In other words, the processor 122 executes the instructions or creates the modules shown in environment 150 to provide the functions described herein (such as to provide the functionality shown in FIGS. 2-6 and functions described with reference to system 100). The modules 152-164 (and/or the code/instructions executed by the processor 122) may be thought of as providing the structure in the computer system or apparatus 120 for providing the functions taught herein to debug or analyze a computer program that includes a number of objects, which are typically each defined by sets or bundles of code that separately are executable by the system 120 or processor 122 without error (e.g., without causing the system 120 to crash, without bugs/errors that are detectable by the debugger module 152, or the like).

Figure 2:
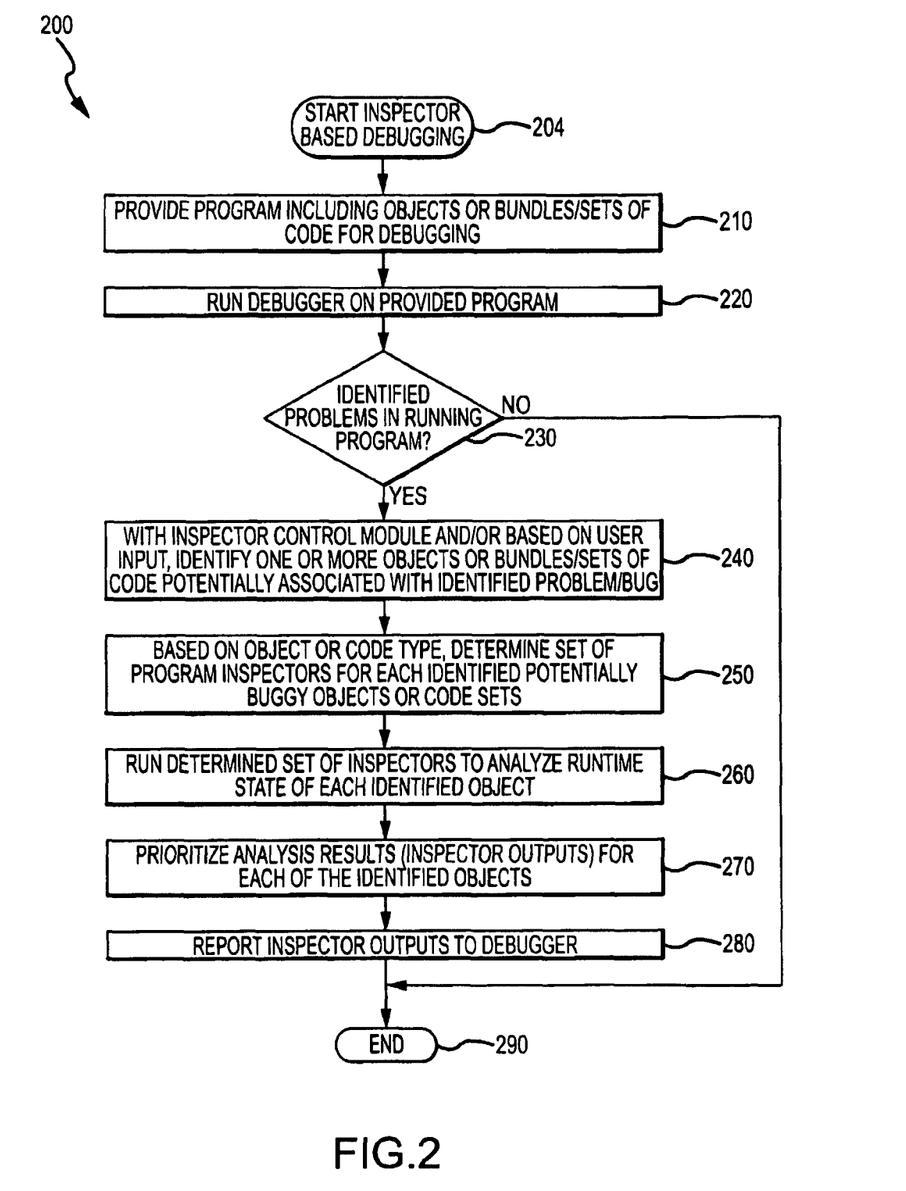
FIG. 2 illustrates a flow chart of an exemplary program inspector-based debugging method such as may be implemented, for example, by operation of the system of FIG. 1.

FIG. 2 illustrates an inspector-based debugging method 200 as may be carried out by operation of the system 100 of FIG. 1 or a similar system, e.g., a system in which an IDE or the like is used to selectively use program inspectors to query runtime states of objects or program components that may include numerous lines of code to identify possible issues or misuses of an object (when compared with conventional usages). The method 200 starts at 204 such as with loading inspector-based tools into a debugging environment, an IDE, or the like or modifying a debugger to present inspector-based tools to a user and selectively invoking such inspectors/scripts to debug a program or portion of a program. Step 204 may also include storing a set of program inspectors that are each adapted to analyze an object or program component for potential issues, non-standard uses, bugs, or the like and potential remedies and such analysis may involve querying a runtime state or similar information available in a debugging environment related to the object or program component. The program inspectors are made available to debugging environments or debuggers running on the same or different computer systems.

At 210, the method 200 includes providing a program including objects or bundles/sets of code (e.g., program components) for debugging. For example, an IDE may be used to create a program such that the program may be debugged within the IDE along with selection and configuration of objects of a framework. At 220, a debugger is run on the provided program, which may result in the program running without failure but one or more components or objects not running or performing as intended. Step 220 may also result in the production of debugging information including the runtime state of the program and of its components or objects (e.g., of various sets of code or lines of code within the program). At 230, the method 200 continues with a determination of whether there are any problems or unintended operations in the running program, and these problems may not rise to the level of a crash but may, instead, be an undesirable operation of a component or object (e.g., a part of a UI may not render or may be displayed in an unwanted location or the like). Step 230 may be performed by the debugger but many times may be performed by the developer or user by inspecting the output or results of running the program. If no problems or issues exist, the method 200 may end at 290.

If the developer/user identifies problems with the program, the method 200 continues at 240 with the inspector control module and/or based on user input, identifying one or more objects or bundles/sets of code that are potentially associated with the identified problem or bug. In some embodiments, the debugging environment may be provided with the intelligence to identify objects that may be operating improperly or in nonstandard manners and present this list to the user (e.g., via a debugging GUI or the like). In other embodiments, the debugging environment at 240 relies on the user to find one or more objects within the debugger that may be the cause of the problem, and the debugging environment may prompt the user or allow the user to select these objects for processing with one or more program inspectors.

At 250, the debugging environment (such as with an inspector control module) acts to determine the type (or other parameter(s)) of the one or more objects identified in step 240. Then, based on the object or set of code type, the debugging environment (such as with an inspector selector) acts to determine a set of program inspectors for each of the identified and potentially buggy/problematic objects or sets of code. At 260, the method 200 continues with the debugger invoking or running these sets of program inspectors to analyze each of the identified objects (e.g., to query the runtime state or other debugging data for the object or program components) to determine whether an issue or bug defined by the program inspector is present in the object or program code (e.g., did a user or developer of a program misuse the object or program component in a way that may be causing the problem identified in step 230).

At 270, the analysis results or inspector outputs (which typically include a brief description of the identified potential issue and a suggested remedy and, in some cases, a link to a more full explanation of the problem and corrective actions) may be prioritized for each of the identified objects, with one embodiment assigning a rank or importance to each inspector and then ordering the results/outputs based on which inspector provided them. At 280, the method 200 includes the debugging environment acting to report the inspector outputs to the debugger/developer such as by providing a dialog box or a results window within the debugger or IDE GUI. The reported output may include a prioritized list of the identified issues/bugs with associated remedies. At 290, the method 200 ends.

The user interface and/or reporting of outputs of the inspector programs may take many forms, but it may be useful to illustrate at least one exemplary user interface and reporting box/window to show how the debugging environment (or IDE) may be configured to present the scripts or inspector programs in a useful way to a user/developer. One driving force behind the described debugging environment was a recent experience in which a UI component was being created but causing problems in obtaining desired or intended functionality. Using a conventional debugger, a candidate or likely object with a bug was selected within the debugger but hundreds of methods and properties were presented in the debugger user interface, which made it very difficult to determine what the problem or error was in the object. The problem took many hours to resolve.

Figure 3:
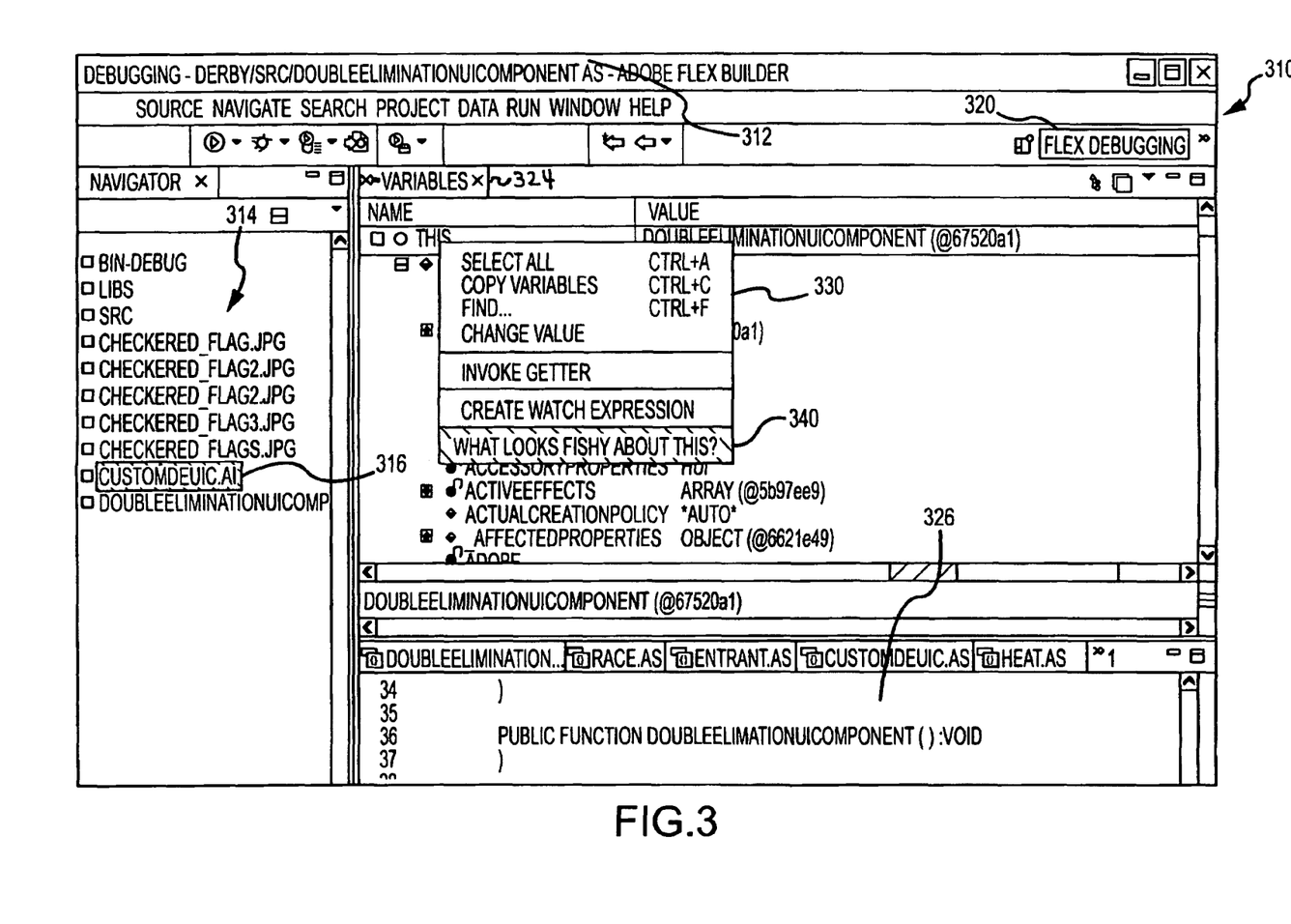
FIG. 3 illustrates an exemplary user interface as may be provided on a monitor by a debugger of an embodiment described herein such as during operation of the system of FIG. 1 to prompt a user or developer to run program inspectors on an object, component, subroutine, or set of code within a program to identify potential issues or bugs.

In contrast, FIG. 3 illustrates a debugger window or GUI 310 that may be presented or generated in a debugging environment as described herein. The GUI 310 has a title line or box 312 that indicates a debugging environment is being provided (or debugging is occurring) and indicates the program that is being debugged (as well, in this case, that the IDE is provided within Adobe Flex Builder, but, of course, this is not required). A side pull down menu or list 314 is provided that allows a user/developer to provide debugging input such as finding one or more objects that they believe or have determined are behaving improperly or not as intended (e.g., may have a bug or a nonstandard usage), with a particular component 316 shown to be chosen by the user for debugging. Box 320 also indicates the particular action or function that is being performed within the debugging environment (i.e., debugging). The GUI 310 further includes a section or subwindow 326 in which lines of the code in the selected object may be displayed to the user, and the user may be able to scroll through the lines of code (which may include hundreds or thousands of lines of code written by another in many cases).

The GUI 310 may also include a variables button 324 that when selected as shown causes the debugging environment to update the GUI 310 to provide a pull down list or menu 330 with selectable functions or actions. Specifically, the user may select a "What Looks Suspect About This" button 340 (which may also take other names/labels such as "Run Program Inspectors On the Selected Object/Program Component" or the like). Upon clicking or selecting context menu at 340, a set of applicable inspectors is run on the selected object 316, 326.

Figure 4:
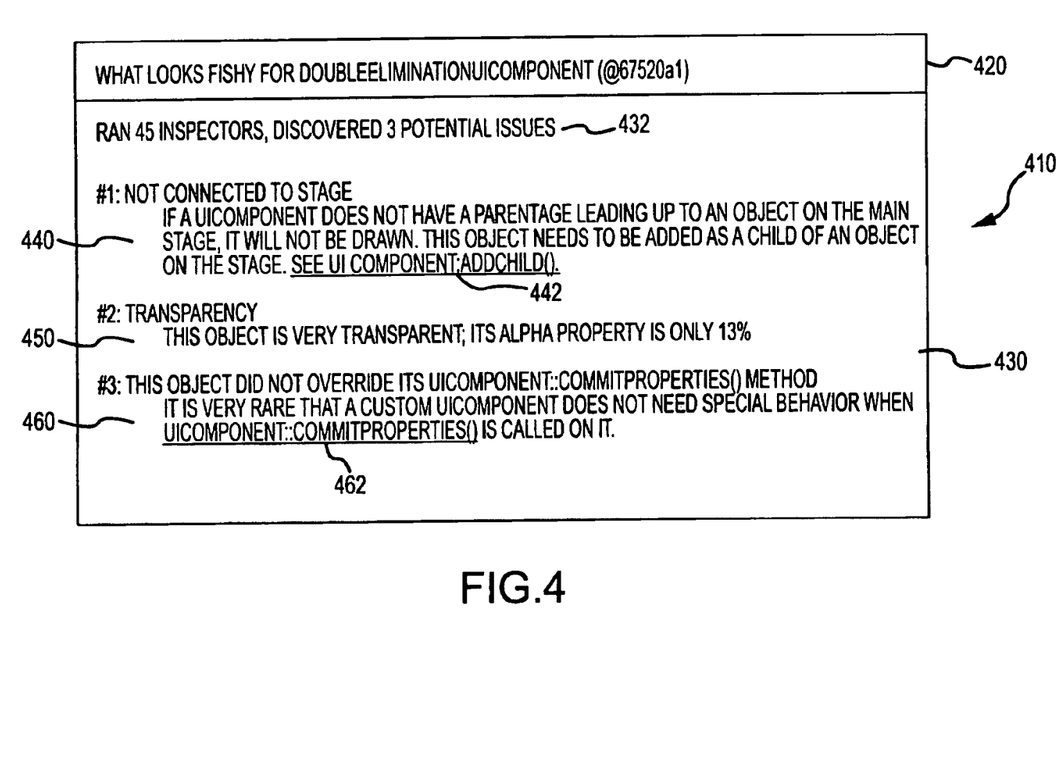
FIG. 4 illustrates a dialog box that may be provided to report or provide inspector/debugger output to a user or developer that selects to run program inspectors on a program.

FIG. 4 illustrates a reporting or dialog box 410 that may be provided by the debugging environment to report the results or outputs of the run inspectors. The title label or box 420 indicates what information is being reported, e.g., the results of "What Looks Nonstandard" or what potential bugs or issues were identified for a particular program component or object. In dialog window 430, the displayed inspector output or report 410 may include a summary at 432 indicating how many (and which ones in some cases) inspectors were run against the object or program component and the results of this run or analysis (such as the number of potential issues identified by the inspectors).

In this example, there are three identified potential issues or bugs 440, 450, 460, and these may be displayed in a prioritized manner (such as based on possible seriousness with regard to the inspected set of code operating or running properly or in an intended/standard manner). The first issue 440 includes a brief explanation of the issue and remedy (e.g., that a UIComponent does not have proper parentage and this may be corrected by adding the inspected object as a child to another object). A link 442 is also provided with further explanation of the problem and/or remedy, which may be co-located on the same machine/computer as the inspector tools and brief explanations/remedies or upon a different device such as a debugging server or the like networked to the developer's computer or network node. The second issue 450 only includes a brief explanation of a potential issue, which may include a rule and/or tip on use of the underlying object and/or its use within a framework in some applications. The third identified issue 460 is also briefly explained (e.g., an object did not perform in an intended/expected manner) along with a tip for correcting the issue (e.g., indicating what is an intended usage or functionality of the object), and a link 462 is provided to a more detailed explanation of the issue/bug and a likely technique for remedying the issue.

In some embodiments, the issues 440, 450, 460 may also be categorized by type of issue (e.g., drawing issues, event handling issues, and the like). In other cases, the issues are also ranked by importance or prioritized as discussed above while some are reported with the details (in place of a link) and such detailed explanations may be collapsible/expandable to allow selected viewing by the developer in the dialog box 410. The general point or concept is to provide inspector-based tools in a debugging environment that are able to present to the user or developer a targeted or reduced list of issues or possible bugs/misuses of third party code sets that are worth addressing or at least considering in addressing a nonstandard, unanticipated, or less than optimal performance of a software application or program (e.g., a software product developed through use of a framework and objects available in the framework).

In some cases, it may be useful for debugging (or IDE) extensions to be web-based such as available via developer communities and their servers. In the case of program inspectors or inspector scripts, these may be provided as developer community support tools that various web communities may post (such as to a user community hosted by a web server to which a developer may subscribe for updates with regard to particular program inspectors or other debugging or IDE extensions). During use of a debugging environment such as an IDE, community-posted/maintained inspectors may be imported into the user's/developer's IDE and kept up to date. This has an advantage of allowing anyone or numerous people/programmers to produce the debugging tools, which lessens the duties or requirements placed on a provider of a framework, library, or other pool of object/program components for developer use. Developers in such embodiments of the debugging scheme are able to customize their debugging environment by subscribing to developer communities with common interests and then automatically incorporating development tools such as debugging/IDE extensions that the community makes available to its members.

Figure 5:
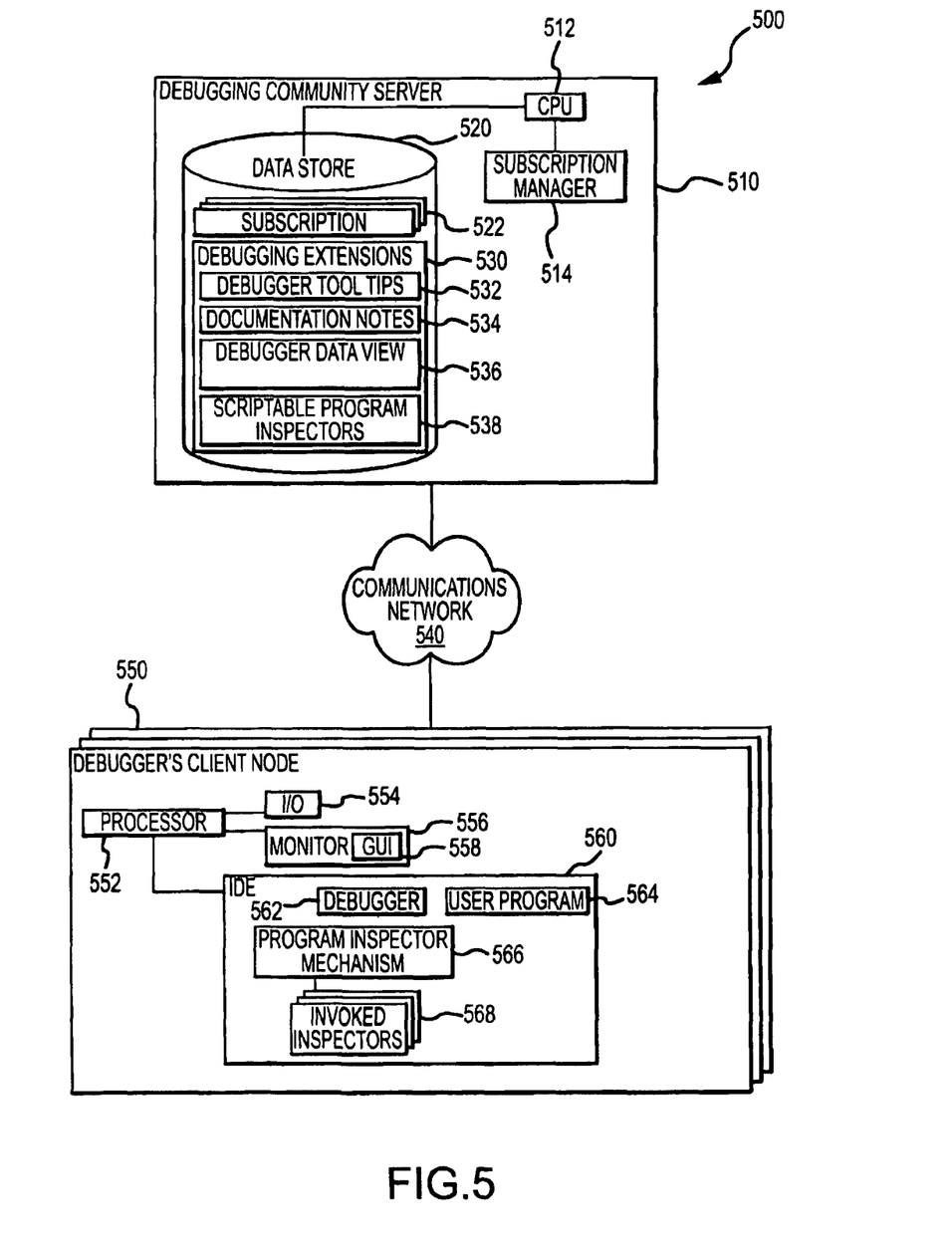
FIG. 5 illustrates in functional block form a debugging system or network supporting use of Web-based extensions in a debugging environment (such as an integrated development or debugging environment (IDE)), with the extensions typically including program inspectors accessible within a user community or other source via a communications network.

For example, FIG. 5 illustrates a debugging system or network 500 that includes a number of debugger or developer client nodes 550 that are linked to a user community server 510 via a communications network 540 such as the Internet. Each client node 550 may be a developer's workstation or similar computing device with a processor 552 operating I/O devices 554, memory, and a monitor 556 with a GUI 558 for displaying a debugging environment or IDE including outputs of program inspectors and other debugging extensions (such as debugger tool tips and the like). The processor 552 also runs or provides an IDE 560 that includes a debugger 562 that is being used to assist in development or generation of a user program or software application 564 (e.g., use of a set of objects within a framework that are modified to provide a user program to perform a particular function). A program inspector mechanism 566 is provided for use by the debugger 562 in inspecting program components or objects within the user program 564 such as by using one or more invoked inspectors 568 (which are selected for use based on a particular identified object and its type and/or based on a category/type of issue/bug identified by the debugger 562 or selected/input by the user of the node 550).

The user of the client node 550 may subscribe to one or more debugging communities to obtain updated inspectors 568 and/or other debugging extensions for use by the debugger 562 and/or the program inspector mechanism 566 during debugging of the user program 564. As shown, a user community server 510 may be connected to the network 540 to server debugging extensions 530 to subscribers such as a user of node 550. To this end, the server 510 may include a processor 512 that runs a subscription manager 514 and other components (not shown) to manage subscriptions 522 for users of nodes 550 and to manage updating and delivery of the debugging extensions via network 540. The debugging extensions 530 may take a variety of forms to implement the system 500 and may be updated by members of the community associated with server 510 (or by others). The debugging extensions 530 for example may include debugger tool tips 532, documentation notes 534, debugger data view enhancements 536, scriptable program inspectors 538, and other tools useful in a debugging environment. Each of these extensions may be selectively downloaded to the client node 550 (such as based on their subscription 522) for use in the IDE 560 to debug or otherwise modify the program 564.

As can be seen from the above description and FIG. 5, the IDE adapted with an inspector mechanism along with connections/communications with debugging communities and their servers extends the functionality of the IDE. The communities' debugging extensions including program inspectors may be automatically updated and made available to the user of the debugger's client node as if they were built into the IDE. For example, as described above with reference to FIGS. 1-4, the program inspector tools for debugging may be subscribed to individually or in a group manner (such as by issue category, by object type, by framework, and so on) and then automatically and/or periodically made available to the developer within the context of the debugging window or IDE GUI.

There are many developer community forums strewn across the Web, with there being several communities for each programming language as well as communities for differing types of technologies (e.g., graphics, databases, IT, and the like). These forums have huge amounts of information stored in them or available via their servers/served sites that are invaluable to many developers. Unfortunately, it is not at all easy to find the threads of conversations in these forums that may be pertinent to you or your immediate situation or debugging problem. The system 500 and method 600 of FIG. 6 allow a developer to access the collected wisdom of a developer or user community that is deployed inside a member's development environment, e.g., via subscriptions to the community which results in a server providing access to debugging extensions including program inspectors. As such, the context in which the developer is having the problem is better known. Indeed, the runtime state of the program may be available to the debugging environment/IDE and its tools (e.g., inspector control mechanism) to determine which varieties of extension such as inspectors are most applicable to the problem or bug. This makes the accumulated wisdom of a group much more accessible to its members and, thus, reduces the time, costs, and difficulty of application development.

In this description, a number of debugging extensions may be served from developers' communities to subscribing developers' nodes for use in their IDE or debugging environment. For example, debugger tool tips may be provided that may be provided depending upon the object being debugged. In some implementations, these tips may be selected by the DE based on a location of a mouse or other user input selecting an object or portion of an object, and the IDE may act to consult its stored set of extensions and particularly set of debugger tool tips to see if any tips should be presented to the developer in the IDE or debugging GUI (e.g., as "popup tips" or the like when registered for that situation/context and that framework object).

The extensions may also include documentation notes. These notes provide an ability for the development/user community to add sticky notes, margin comments, or other notes to the documentation for pages or objects of a framework. The applicable notes may be determined by the DE, debugger, and/or inspector control mechanism based on the currently visible topic and/or object being debugged. The documentation notes may then be displayed within the IDE's GUI such as in a "help" window. The debugging extensions may also include debugger data view enhancements. Many debuggers (such as gcc, MSVC, and the like) allow a user to customize the way a variable's data is displayed in the debugger or its GUI. This allows sophisticated types to be displayed (such as std::string) in a more "natural" way rather than exposing their internal workings/details. For example, MSVC has a fairly rich facility for this in the form of autoexp.dat files, and these or similar view enhancements may be provided as debugging extensions that are subscribed to via a community and downloaded to a client node for use in an automatically updated manner in an IDE. As discussed in detail herein, the extensions may also include program inspectors that provide tools for debugging environments such as scripts that may be run while debugging to determine what about an object or program component appears to be problematic or nonstandard.

Figure 6:
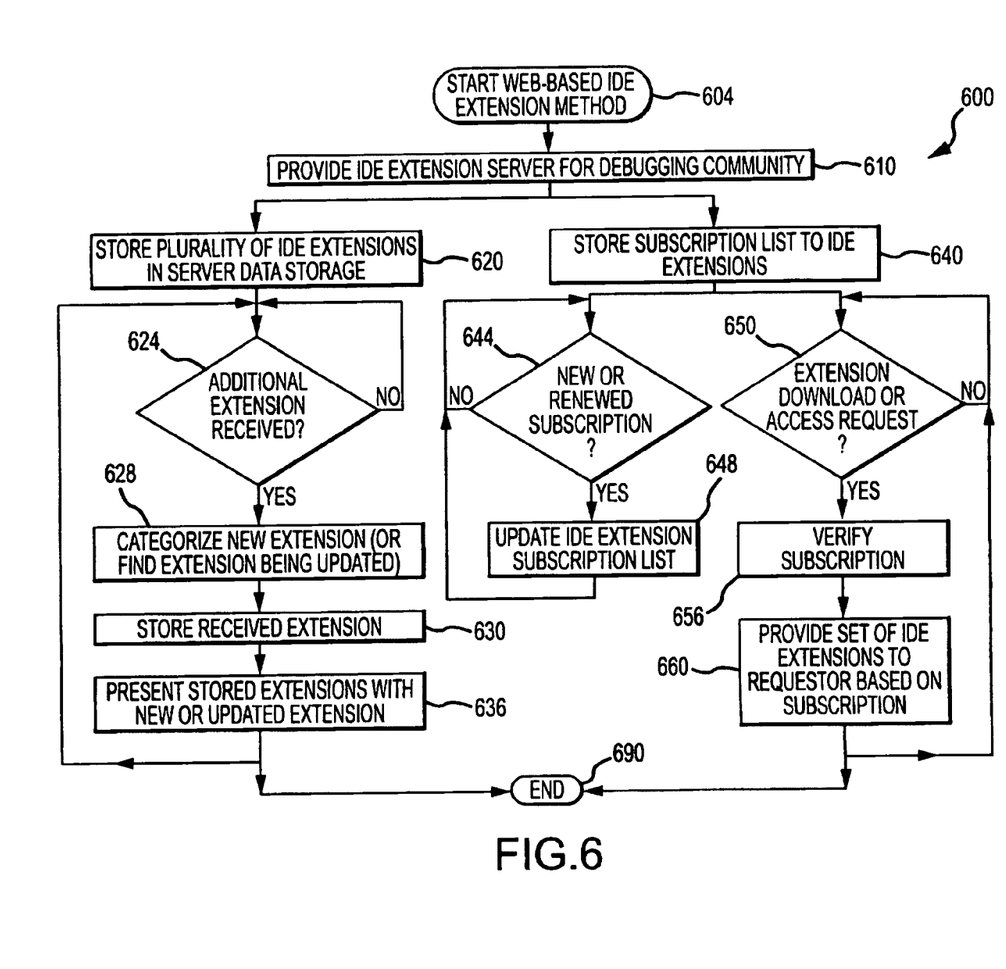
FIG. 6 illustrates a Web-based IDE extension method as may be provided by operation of the system or network of FIG. 5.

FIG. 6 illustrates a Web-based IDE extension method 600 that may be provided by operation of the system 500 of FIG. 5 or other debugging networks/systems. The method 600 starts at 604 such as by providing a plurality of client nodes operated by developers to develop programs or software application (e.g., with a framework tool or IDE that includes an inspector control mechanism for selectively invoking inspectors and other IDE extensions). The method 600 continues at 610 with providing an IDE extension server for a user community or communities, and this server is made available over a network to the developers or their client nodes/computers.

At 620, the method 600 includes storing a plurality of IDE extensions in the server's data storage or a data store accessible by the web server. At 624, it is determined by the server whether additional IDE extensions are received or being posted by community members or the like, and if not, the server waits for additional extensions to store/serve or for updates to previously stored extensions. At 628, if an extension or extension update is posted to the server, the method 600 may include categorizing the new IDE/debugging extension (e.g., is it an inspector or view enhancement?) or determining it is an update to a previously stored extension. At 630, the received extension is stored in the server data storage and, at 636, the development community server presents or serves the stored extensions to subscribers with the new or update extension. The method 600 may now end at 690 or continue at 624.

In parallel to steps 620-636, the method 600 may include storing subscription lists to one or more of the IDE extensions at step 640. For example, a developer may subscribe to receive all IDE extensions pertaining to a particular community, to a particular framework, to a particular technology such as graphics, UI development, or the like, or to other subsets of posted/available IDE extensions. At 644, the method 600 may include the community server/subscription manager acting to determine whether a new or renewed subscription is received and when received, acting at 648 to update the IDE extension subscription list in its memory.

Concurrently or in parallel, the method 600 may include at 650 determining with the community server whether an extension download or access request has been received from a developer node. In other embodiments, the server may determine whether a periodic download of IDE extensions is due or whether other methodology of distributing extensions based on member subscriptions should be implemented. At 656, the subscription of the requester is verified and processed to determine whether the requester has subscribed to the requested IDE extensions. If proper, at 660, the server acts to provide the requested set of IDE extensions or to provide extensions corresponding to the requester's subscription. The method 600 may end at 690 or continue at 650.

The system 500 and method 600 provide a mechanism for disseminating the IDE extensions (e.g., debugging technologies, answers, and the like) as they are produced and posted within an online or otherwise accessible developer/user community. This allows the developer to continue to work within their IDE or other debugging environment, which they may be familiar and comfortable with, rather than having to search online forums in an attempt to find an answer to a question. Moreover, they do not have to form the proper question or express the context of their issue in a proper manner and language (e.g., their first language may not coincide with that of the online debugging/developers' forum) in order for a search engine or forum participant to help them locate pertinent information. The IDE or debugging environment may have or generate a large set of information about what the user or developer is presently doing to create a program and what the state is of the program and its components/objects, and, hence, the IDE may readily be adapted to sift through the debugging resources such as program inspectors and other IDE extensions to identify and then implement the ones that appear relevant based on the IDE or debugging information corresponding to the user's program.

One useful technology for delivering the IDE or debugging extensions may be a Really Simple Syndication (RSS) feed. For example, the extension information may be encoded in eXtensible Markup Language (XML), where the XML data may contain information like: (a) extension category (e.g., tool tip, doc note, view, script, and the like); (b) context in which the extension is applicable (e.g., selected object in debugger is of type x; current help document title is y; user has imported framework z; and the like); (c) brief description of the extension's purpose; (d) data relevant to the category (e.g., text, autoexp.dat fragment, program inspector script, and the like); and (e) URI link to detailed information and discussion about the extension's reason for being. The IDE or debugging environment may then periodically look for updates to the RSS feeds that the user has subscribed to and then grab those new extensions and make them immediately available for use within the context of the IDE or debugging environment.

Although the invention has been described and illustrated with a certain degree of particularity, it is understood that the present disclosure has been made only by way of example and that numerous changes in the combination and arrangement of parts can be resorted to by those skilled in the art without departing from the spirit and scope of the invention, as hereinafter claimed. For example, a line of code is intended as is common in the industry such as to include a single or simple command, variable assignment, and the like such that a set of code, object, or program component that includes or corresponds to lines of code would include two or more of lines of code (e.g., a single line of code would not be considered to provide an object of a framework as such objects are typically provided by many lines of code or defined by execution of by many lines or sets of code).

Further, the scripts or program inspectors may be provided in a wide variety of locations or devices such as within a debugging environment or the machine/computer running a debugger. The analysis scripts or inspectors may be downloaded and run on the fly on the computer used to debug a program such as by the IDE or the like. When used, the tips and other debugging extensions may be bundled in the frameworks themselves, for instance, in metadata descriptions alongside the objects of the framework (e.g., as in C#, Action- Script, or the like). These may be deployed by the organization that produced or provides the framework or others. Other mechanisms for distributing the program inspectors and debugging extensions may be provided via user communities that a developer may subscribe to obtain debugging extensions on the fly or periodically.

Some program inspectors may provide simple tips that may be otherwise provide in a frequently asked questions (FAQ) or troubleshooting section of a book, but these tips/rules/suggestions are provided in a more interactive way during debugging and are provided selectively when needed for particular objects or program components (e.g., a tip has little relevance to a programmer until it is needed or useful to their development situation). The described debugging environments and methods determine the applicability of these rules, tips, and answers to FAQ dynamically determined in the context of the debugger or IDE, which can significantly simply the debugging and program development processes (e.g., lead to more ready adoption and use of software frameworks and libraries to create new programs, applications, and the like).

The particular implementations of program inspectors (or of scripts) that may be used to practice the systems and methods described herein may vary widely and are not limiting of this description and following claims, but it may be useful to generally describe a typical inspector and provide several specific examples. An inspector may comply with or include a few basic concepts or components. First, an inspector may include a list of object types for which it is applicable (e.g., an inspector script for detecting XML dom misuses would not be useful on a DisplayList and so on). Each inspector may also include a block of code which pokes around in the object and looks for issues (e.g., a component that determines whether a particular problem, bug, or misuse is present in a program component or object). Further, an inspector may include a mechanism for reporting back any issues. The following specific examples (e.g., Flex SDK examples) are not provided in any particular language and are not limited to a particular API definition, but, instead, the examples are provided in pseudo-code for easier reading/understanding.

EXAMPLE 1

Graphic not Attached to a Stage

The following script determines the presence or absence of this deadly and common mistake (no addChild( ) call) within the lines of code of the object or program component.

```
class DispObjStageInspector implements Inspector
{
    virtual ArrayOfTypes GetApplicableTypes( )
    {
        return [ flash.display.DisplayObject ]
    }
    virtual ArrayOfIssues Inspect(DisplayObject obj)
    {
        ArrayOfIssues res;
        if obj.stage is null
            res.append new Issue("object not on a stage",
                "will not draw..., see 'addChild( )'");
        return res;
    }
}
```

EXAMPLE 2

Graphic Transparent

The following exemplary script checks more than one thing, e.g., the objects intrinsic alpha as well as the "composite" alpha on its way to the stage, and both might be reported as output for the script or program inspector.

```
class DispObjTranspInspector implements Inspector
{
    virtual ArrayOfTypes GetApplicableTypes( )
    {
        return [ flash.display.DisplayObject ]
    }
    virtual ArrayOfIssues Inspect(DisplayObject obj)
    {
    ArrayOfIssues res;
        if obj.alpha < 20%
            res.append new Issue(
                "Objects alpha value is XX",
                "The object will draw faintly");
        if compute composite alpha through parentage < 20%
            res.append new Issue("Object is in a chain whose net alpha...",
                "The object will draw faintly");
        return res;
    }
}
```

EXAMPLE 3

Graphic Drawn Off Stage

This exemplary program inspector makes sure the given object is in a transform chain, which puts it visibly on the stage and which is a common usage error or programming error that occurs in usage of objects in a framework. Similar to this would be "Graphic obscured behind other graphics".

```
class DispObjOffStageInspector implements Inspector
{
    virtual ArrayOfTypes GetApplicableTypes( )
    {
        return [ flash.display.DisplayObject ]
    }
    virtual ArrayOfIssues Inspect(DisplayObject obj)
    {
        Rect myBounds = get obj bounds in stage coordinates;
        Rect stageBounds = get stage bounds (in stage coords);
        if myBounds does not significantly overlap stage bounds
            res.append(...)
        return res;
    }
}
```

EXAMPLE 4

Missing Expected Overrides

This program inspector script provides a more subtle example. Certain framework classes require subclasses to override various methods. If they (e.g., a program component or a framework object) do not perform various activities at critical times, they will not behave as expected. This example script or inspector makes sure the important UIComponent methods are overridden (or that this usage error or bug is not present). Note that "does not override" is easy to say in English but harder in AS or script.

```
class UiCompOverrideInspector implements Inspector
{
    virtual ArrayOfTypes GetApplicableTypes( )
    {
        return [ mx.core.UIComponent ]
    }
    virtual ArrayOfIssues Inspect(UIComponent obj)
    {
        ArrayOfIssues res;
        if obj does not override "commitProperties"
        {
            res.append new
                Issue("does not override commitProperties method",
                    "Bad because....");
        }
        ... ditto for onPropChage( ), createChildren( ), ...
        return res;
    }
}
```

EXAMPLE 5

Basic Programming Error, Override Method does not Invoke Super( )

This inspector example is a case where in theory a compiler could statically detect this, but supposing that it did not, this could be invaluable.

```
class OverrideInspector implements Inspector
{
    virtual ArrayOfTypes GetApplicableTypes( )
    {
        return [ object ]
    }
    virtual ArrayOfIssues Inspect(object obj)
    {
        for each method in obj.methods( )
        {
            if method is an override (parent has method of same name?)
            {
                if method does not call super( ).method( )
                {
                    res.append new Issue("super( ).method( ) not
                        called", ...);
                }
                else if call to super( ).method( ) happens late
                {
                    res.append new Issue("super( ).method( )
                        called late", ...);
                }
            }
        }
        return res;
    }
}
```

Others examples might include inspectors that inspect the event notification, inspectors that look at listener hierarchy to see whether particularly critical events are passed to the identified object, and inspectors that determine whether important events which the object identified for debugging generates are being listened to by anyone.

I claim:

1. A computer-implemented method, comprising:
on a computer system, receiving a computer program that operates improperly as a result of the computer program comprising at least one bug;
running a debugger to generate debugging information for objects of the computer program, including runtime state information for each of the objects;
identifying at least one object for inspection that is potentially associated with the at least one bug, wherein each identified object is defined by a set of code that executes without generating a bug being detected by the debugger;
determining an object type for each identified object;
automatically selecting a set of program inspectors to perform the inspection of each identified object based on its determined object type;
performing the inspection of the identified object with the invoked set of program inspectors within a development environment using the runtime state information, wherein the set of program inspectors are adapted to inspect particular object types to determine whether the identified object is associated with the at least one bug in the form of at least one of a program code error and an object use error, and wherein the object use error is defined as an improper or nonstandard use of the object type with respect to another object of the computer program; and
generating a report of at least one of the program code error and the object use error identified by the invoked set of program inspectors for the identified object.

2. The method of claim 1, wherein each of the program inspectors comprises a script, wherein the inspection includes invoking the script within a debugging environment in which the debugger is running to query the debugging information, and wherein the selecting of the program inspectors is performed within the debugging environment via an inspector selection module run by a processor of the computer system.

3. The method of claim 2, wherein for each of the objects the corresponding set of code further defines object transitions during execution and wherein the inspection comprises using the script to compare defined object transitions with transitions provided in the runtime state information for the identified object.

4. The method of claim 1, wherein the report comprises an explanation of the identified object use errors, a remedial course of action for each of the object use errors, and a link to a detailed report on the identified object use errors and corrective actions to address the identified object use errors.

5. The method of claim 1, wherein the inspection further comprises prioritizing the object use errors determined present in the set of code and presenting the object use errors in the report based on the prioritizing.

6. The method of claim 1, wherein the inspector selection module selects the set of program inspectors by identifying the set of program inspectors within a pool of program inspectors accessible to the debugging environment as being applicable to the object type.

7. The method of claim 1, wherein the report is displayed within a user interface generated within a debugging environment provided by the computer system and wherein the object user errors comprise nonstandard uses of the identified object.

8. The method of claim 1, wherein the identifying of the object for inspection comprises displaying a prompt via a debugging environment user interface provided on a monitor in the computer system indicating that program inspectors may be run on the identified object and receiving a user input selecting the displayed prompt.

9. The method of claim 1, wherein the objects of the computer program each includes an object provided within a programming framework.

10. A non-transitory machine-readable storage medium embodying instructions that, when executed by a machine, cause the machine to perform operations comprising:

receiving a software product that operates improperly as a result of the software product comprising at least one bug;

debugging the software product having a number of objects in a framework, wherein each of the objects is defined by a set of error-free code executable to provide a functionality;

identifying at least one of the objects for inspection that is potentially associated with the at least one bug;

determining an object type of the identified object;

automatically selecting, from a plurality of program inspection scripts, a set of inspectors to perform the inspection of the identified object based on its determined object type;

invoking the set of inspectors within a development environment to analyze runtime state information for the identified object, wherein the set of inspectors are adapted to inspect particular object types to determine whether the identified object is associated with a bug in the form of a program code error and/or an object use error, and wherein the object use error is defined as an improper or nonstandard use of the object type with respect to another object of the software product; and generating a report comprising a description and an associated programming remedy for at least one of any programming errors and object use errors identified by the invoked set of inspectors for the identified object.

11. The non-transitory machine-readable storage medium of claim 10, further comprising instructions that, when executed by the machine, cause the machine to run a debugger on the software product to generate the runtime state information for the identified object.

12. The non-transitory machine-readable storage medium of claim 11, further comprising instructions that, when executed by the machine, cause the machine to generate a user interface and to display the user interface on a monitor, wherein the user interface includes the generated report.

13. The non-transitory machine-readable storage medium of claim 12, further comprising instructions that, when executed by the machine, cause the machine to receive user input via the user interface selecting the identified object prior to the selecting of the set of inspectors.

14. A computer system, comprising:
a processor; and
non-transitory data storage storing a debugger module, a user program including a plurality of objects each defined by a set of code, an inspector control module, and a plurality of program inspectors,
wherein the debugger module is run by the processor to produce runtime state information for each of the objects of the user program, the sets of code each being executable by the processor without failure,
wherein the inspector control module is run by the processor to both identify at least one of the objects for debugging that is potentially associated with the bug and identify an object type of each identified object, the inspector control module further to invoke at least one of the program inspectors based on the object type, the at least one of the program inspectors to query the runtime state information of the identified object, wherein each of the program inspectors defines a usage error associated with the identified object, the usage error defining an improper or nonstandard use of the object type,
wherein each of the program inspectors is adapted to inspect particular object types to determine whether the identified object is associated with a bug in the form of at least one of a program code error within its respective set of code and an object use error that is defined as an improper or nonstandard use of the identified object with respect to another object of the user program, and
wherein the inspector control module generates an output reporting the presence of the usage error and providing a remedy for the usage error.

15. The system of claim 14, wherein the identifying of the one of the program objects by the inspector control module comprises receiving user input in a user interface generated by the debugger.

16. The system of claim 14, wherein the inspector control module selects the at least one of the program inspectors based on the object type of the identified object.

17. The system of claim 16, wherein the objects each comprise an object of a software framework and wherein the object type is an object type defined for the software framework based on functionality provided by the corresponding set of code.

18. The system of claim 14, wherein the runtime state information includes transition information for the identified object and wherein the presence of the usage error is determined by comparing the transition information to a set of predefined transitions for the identified object retrieved from the data storage.

19. The system of claim 14, wherein the inspector control module further operates, prior to the invoking of the at least one of the program inspectors, to download a plurality of additional ones of the program inspectors into the data storage including program inspector scripts from a server communicatively linked to the computer system and making the plurality of program inspectors available to the inspector control module.

* * * * *